Aug. 30, 1927.
C. G. STRANDLUND
1,640,625
LISTER PLOW AND PLANTER
Filed July 19, 1920
3 Sheets-Sheet 1
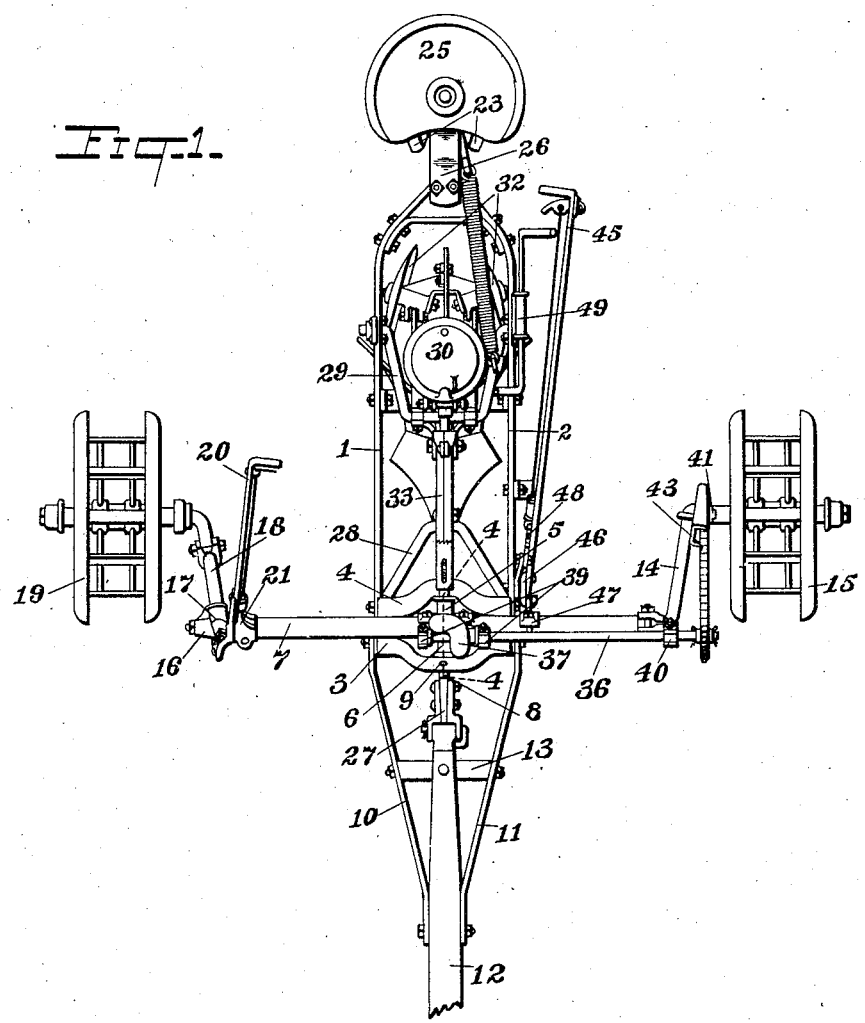

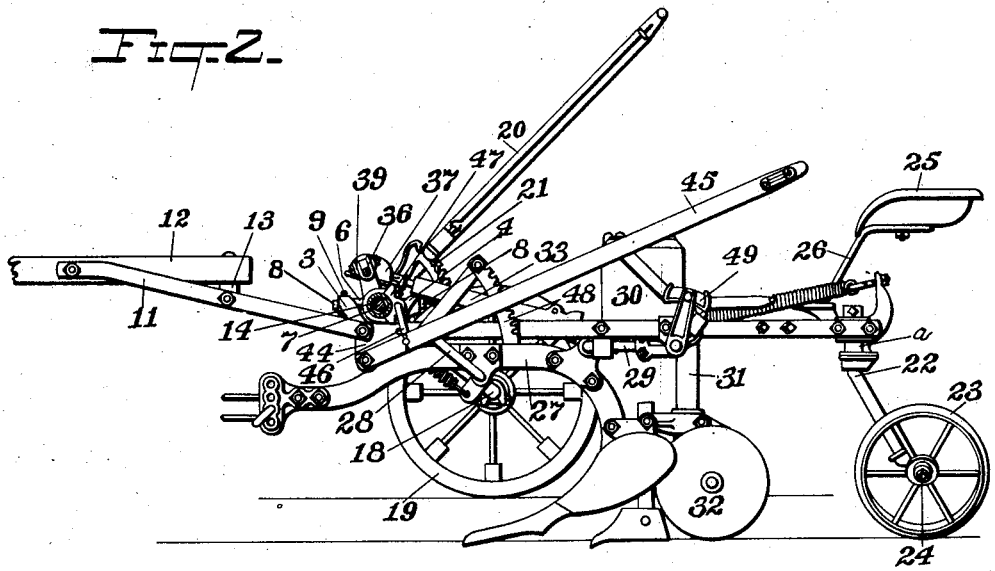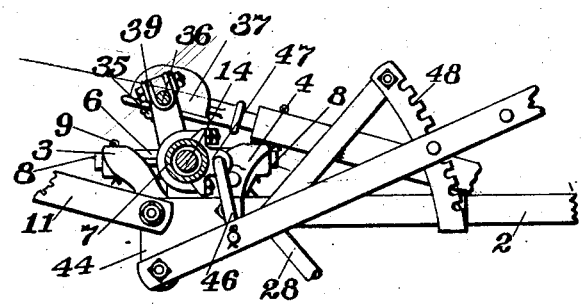

Aug. 30, 1927.  
C. G. STRANDLUND  
1,640,625  
LISTER PLOW AND PLANTER  
Filed July 19, 1920  
3 Sheets-Sheet 3
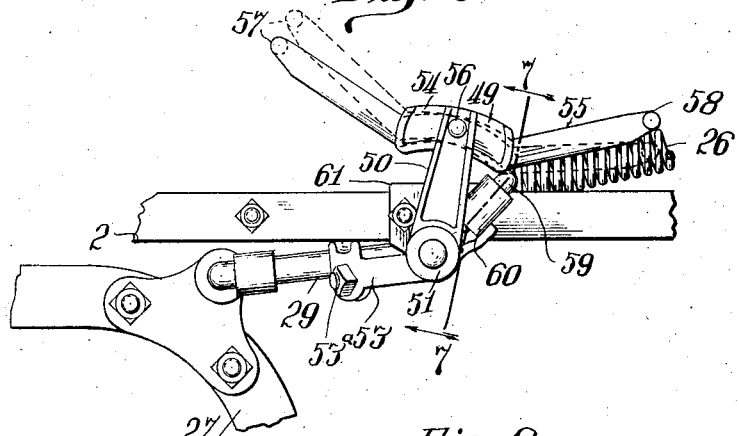
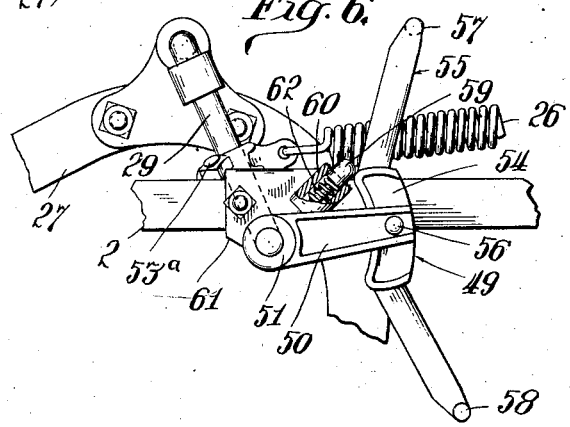
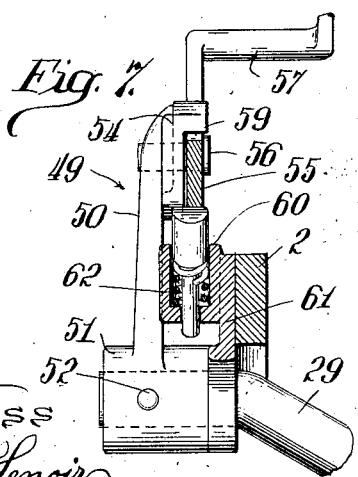
Inventor  
Carl G. Strandlund,  
By Adams Jackson  
Attorneys
Witness  
Milton Lenoir Patented Aug. 30, 1927.

1,640,625

UNITED STATES PATENT OFFICE.

CARL G. STRANDLUND, OF MOLINE, ILLINOIS, ASSIGNOR TO DEERE & COMPANY, OF MOLINE, ILLINOIS, A CORPORATION OF ILLINOIS.

LISTER PLOW AND PLANTER.

Application filed July 19, 1920. Serial No. 397,202.

My invention relates to combined lister plows and planters and has for its object to provide a new and improved implement of that character provided with the usual furrow opener and seeding devices in which those elements are carried by a main frame supported by a wheel frame in such manner that the ground wheels at opposite sides of the machine may move vertically with respect to each other to run on different levels, while they are at all times held against longitudinal movement relatively to each other, and the plow or furrow opener and seeder may be adjusted relatively to the wheel frame to maintain their level position with respect to the ground, notwithstanding lateral tipping of the wheel frame; also to provide power transmitting mechanism for driving the seeding devices from one of the ground wheels, so constructed and arranged that the operation of such power transmitting devices will not be affected by lateral tipping of the main frame with respect to the wheel frame, or by vertical adjustment of the main frame, or of the plow and seeding devices, either with, or independently of, the wheel frame. I accomplish these objects as illustrated in the drawings and as hereinafter described. What I regard as new is set forth in the claims.

Referring to the drawings in which similar numerals indicate identical parts—

Figure 1 is a plan view of a lister plow and planter embodying my invention.

Figure 2 is a side elevation with the rear wheel and part of the axle removed.

Figure 3 is an enlarged detail of the flexible connection for connecting the plow with its supporting means.

Figure 4 is an enlarged detail section on the line 4—4 of Figure 1 viewed from the left of the machine.

Figure 5 is an enlarged detail illustrating the construction of the lever I prefer to use for raising and lowering the plow beam and the seeding devices, showing the parts in the position they occupy when the plow beam is in operative position.

Figure 6 is a similar view showing the position of the parts when the plow beam is raised out of operative position, and Figure 7 is substantially a vertical cross-section on line 7—7 of Fig. 5.

In the embodiment of my invention illustrated in the drawings I employ an open frame such as that shown, described and claimed in my co-pending application, Serial No. 393,055, now Letters Patent No. 1,476,736, composed of bars 1 and 2 which converge at their rear ends to a casting $a$ to which they are rigidly attached. Said bars extend forwardly in parallel relation and are connected rigidly to yoke shaped members 3 and 4, which are spaced apart for the reception of longitudinal bearings 5 and 6 clamped rigidly and centrally to a laterally extending tubular member 7. The bars 1, 2 and the members 3, 4 constitute a main frame which supports the plow and seeder hereinafter described. Pivot pins 8 are secured in openings in the yokes 3 and 4 by cotters 9 and are journaled in the bearings 5 and 6. Pivotally mounted on opposite ends of the yoke shaped members 3 are frame bars 10 and 11 which converge forward to a draft pole 12 to which they are rigidly secured. A cross brace 13 extends between the bars 10 and 11 and is secured thereto and to the pole 12.

The wheel frame hereinbefore referred to comprises the tubular member 7 with the bearings 5 and 6, and an element in the form of an axle 14 which extends through said tubular member and is journaled therein so that it may rock independently thereof except when it is locked against rocking in the manner hereinafter described. The tubular member 7 and the bearings 5 and 6 therefore constitute a flexible connection between the axle 14 and the main frame, which adapts the main frame to rock laterally about a longitudinal axis for leveling purposes, or to be raised or lowered relatively to the front wheels, for depth adjustment, without rocking the axle 14 laterally. At one end the axle 14 is bent downwardly and terminates in a substantially horizontal spindle upon which is mounted a double tread supporting wheel 15. The opposite end of the axle 14 extends beyond the tubular member 7, and rigidly mounted on said axle is a casting 16 having a socket 17 in which is secured the upper end of a crank axle 18 having a substantially horizontal spindle on which is mounted a double tread supporting wheel 19. A lever 20 is rigidly attached to the tubular member 7 and is provided with the usual type of latch to engage with a rack 21 on the casting 16 and preferably integral therewith. By this construction the ground or supporting wheels 15 and 19 are held against movement relatively to each other by the axle as a whole, comprising the members 14 and 18, but they may be moved longitudinally of the machine in unison, to raise or lower the tubular member 7, by actuating the lever 20, and when adjusted may be locked in fixed relation to the member 7 by means of the locking devices associated with said lever as above described.

The rear of the main frame is supported on a vertical portion of a caster shaft 22 which is journaled in the casting a. Wheels 23, converging downwardly, are mounted on an axle 24 secured on the lower end of the caster shaft 22. A seat 25 is mounted on a support 26, on the rear of the frame, convenient to the operating levers hereinafter described.

A plow beam 27 is supported on bails 28, 29, as best shown in Figs. 1 and 2. The ends of the bail 28 are pivotally connected to the yoke shaped member 4 so that it may swing vertically, and the intermediate portion of said bail extends rearwardly and is pivotally connected to the forward portion of the plow beam. The ends of the bail 29 are pivotally connected to the bars 1, 2 of the main frame so that it may swing vertically, and its intermediate portion extends forward and is pivotally connected to the beam, as shown in Fig. 1. A seeding mechanism is supported on the rear of the beam 27, which seeding mechanism, in the machine illustrated, comprises a hopper 30 provided with seed dropping mechanism of any suitable type, a discharge pipe 31, and diverging discs 32. By this construction the plow and seeding mechanism can be adjusted vertically relatively to the main frame, for which purpose a lever 49 is provided, as best shown in Figs. 2, 5 and 6. Said lever is pivotally supported on the frame bar 2 at a point where it is conveniently accessible to the occupant of the seat 25 to rock the bail 29 vertically in either direction upon its pivots. Preferably said lever is constructed and mounted as illustrated in Figs. 5, 6 and 7. As there shown it comprises an arm 50 having at its lower end a sleeve 51 in which one arm of the bail 29 is fitted, it being non-rotatably connected therewith, as by a pin 52 shown in Fig. 7. The arm 50 is arranged to be approximately upright when the plow beam is down in operative position, as shown in Fig. 5, and, therefore, by swinging said arm downwardly and rearwardly the bail 29 may be swung upward to lift the beam and the parts carried thereby, as shown in Fig. 6. To provide a more secure connection between the arm 50 and the bail 29 the sleeve 51 is provided with a rigid arm 53 that extends parallel with one arm of the bail 29 and is clamped thereto by a bolt 53ª, as best shown in Fig. 5. The arm 50 is provided at its upper end with a rigid cross-head 54 which carries a bar 55 that extends longitudinally of the machine and is pivotally connected between its ends to said cross-head by a pivot 56. Foot rests 57, 58 are provided at the front and rear ends of the bar 55 so that it may be rocked in either direction by the operator. The intermediate portion of the bar 55 underlies a transverse flange 59 carried by the cross-head, as best shown in Fig. 7, which limits the rocking movement of said bar on its pivot 56, with the result that downward pressure applied to either end thereof will first cause it to rock on its pivot 56 until it engages one end or the other of the flange 59. If the downward pressure be continued thereafter the arm 50 will be caused to swing backward or forward as the case may be to raise or lower the bail 29.

The arm 50 is normally locked in either of its positions by a detent 59ª mounted in a pocket 60 carried by a bracket 61 secured to the frame bar 2, as best shown in Figs. 6 and 7. Said detent is normally projected by a spring 62 in said pocket, as best shown in said figures. Said detent is positioned so that it may be projected beyond either end of the cross-head 54, depending on the position of the cross-head, as shown in Figs. 5 and 6, and it is obvious that when so projected it will prevent rocking of the arm 50 in one direction or the other,—that is to say, when the parts are in the position shown in Fig. 5 the arm 50 is held against rocking in a clockwise direction to lift the plow beam, and when the parts are in the position shown in Fig. 6 said arm is held against rocking in the opposite direction to lower the plow. Said detent may, however, be moved out of operative engagement with the cross-head 47 by depressing either arm of the bar 55, since, as best shown in Fig. 7, said detent underlies said bar, and, therefore, when the rear arm of the bar 55 is depressed to lift the plow and seeder the initial downward movement of said rear arm forces the detent 59ª downward out of engagement with the cross-head, thereby permitting the arm 50 to swing rearwardly. In like manner, when the plow beam and seeder are in raised position, as shown in Fig. 6, at which time the detent 59ª is projected in front of the cross-head 54, if the front arm of the bar 55 be depressed it will initially move the detent downward out of engagement with the cross-head 54, which will permit the arm 50 to swing forward to lower the plow beam and seeder. The seed dropping mechanism is operated through the usual extensible flexibly connected shaft, indicated at 33, the front member 33ª of which carries at its forward end a bevel gear 34 which meshes with a similar bevel gear 35 on a cross shaft 36 parallel with the member 7, and rocking therewith. The bevel gear 34 is disposed over and is substantially in the longitudinal vertical plane of the axis about which the main frame rocks laterally. A cover 37 is used to protect both of said bevel gears. The forward end of the front member 33ᵃ of the shaft 33 is journaled in a bearing 38 in the cover 37 and is supported thereby, and said cover is itself supported by the cross shaft 36 which is journaled in a bearing 36ᵃ in said cover and in brackets 39 and 40 secured on the tubular member 7. The arrangement is such that the gear 35 is constantly in mesh with the gear 34, about the axis of which it swings when the member 7 rocks. Also, when the seeder is raised or lowered, either alone or in conjunction with the plow, the gear 34 swings about the axis of the gear 35. Power to operate the seeding mechanism is transmitted from the double tread wheel 15 by a sprocket 41 secured to the hub of said wheel and connected to a similar sprocket 42, on the cross shaft 36, by a chain 43. By this construction the train of power transmitting devices from the wheel 15 to the seed dropping mechanism is not affected by the rocking of the member 7 or by the raising or lowering of the seeder or by adjustment of the main frame to vary the depth of plowing effected by rocking the axle 14 to move the front portion of said frame up or down.

Pivoted on a depending bracket 44, on the forward end of the frame bar 2, is a lever 45, and a link 46 is pivotally connected to the lever 45 rearward of the pivot of the latter, said link being pivotally supported in a bracket 47 rigidly secured on the tubular member 7. The lever 45 is provided with the usual type of latch to engage with any one of a series of notches in a rack 48 mounted on the frame bar 2. By means of said lever the main frame may be rocked laterally, i. e. about a longitudinal axis, relatively to the member 7 to maintain the level position of the plow by compensating for any difference vertically between the positions of the wheels 15 and 19.

Heretofore in listers, whether of the double or single row type, in order to maintain the plow level with the ground it has been necessary to swing the supporting wheels, either one or both, forward or backward, due to the fact that the frame carrying the lister parts has always been rigidly connected to the axle of the machine. Consequently the only possible way in such a construction, in which to level the plow and seeding device is by the wheel adjustment, the plow and seeding device being incapable of independent adjustment except vertically, and in such machines no provision is made for adjusting the plow to correct any lateral deviation from straight line plowing and planting. With my invention however, the plow and seeding device are pivotally supported so that they are capable of being swung laterally about a longitudinal axis, and therefore crookedness in furrows can be readily avoided. Furthermore, with one of the wheels 15 or 19 in a trench and the other on level ground, as shown in Figure 2, the wheel frame will be inclined, and with the ordinary type of lister, as before stated, the wheel on the level ground would have to be swung forward or backward in order to keep the plow and seeding device level. By my improved construction, however, by operating the lever 45, the main frame may be rocked in the desired direction on the pivots 8 and the level of the plow and seeding device be readily maintained, notwithstanding the lateral inclination of the wheel frame, or the position of the wheels.

The crank axle 18 and the axle 14, being rigidly connected together by the casting 16, form practically a continuous arched axle, so that by operation of the lever 20 both wheels 15 and 19 are swung simultaneously to raise or lower the plow and seeding device entirely from the ground, or to fix the depth of their operation.

I have illustrated my invention as applied to a single row lister, but it is equally effective when adapted to two row listers, or to wheeled plows.

What I claim is—

1. The combination of the main frame, the seeder having positively actuated seed-delivering mechanism, the furrow opening plow, the seeder and the plow being mounted for vertical adjustment relatively to the main frame, the transversely positioned wheel-carrying frame arranged to rock around a longitudinal axis relatively to the main frame, the power transmitter for the seeder positioned in the vertical plane of the said axis and having its power-receiving end at the central part of the transverse wheel frame, and power devices extending from said transmitter to one of the wheels and arranged to be operated uniformly irrespective of the positions, vertically, of said wheels relative to the seeder.

2. The combination of the main frame, the seeder having positively actuated seed-delivering mechanism, the furrow opening plow, the plow and the seeder being mounted for vertical adjustment relatively to the main frame, the wheel-carrying frame having a pivotal connection at its transverse center with the main frame, whereby the wheel frame is permitted to rock around a longitudinal axis relatively to the main frame, the power-transmitting element for the seeder mounted to be vertically adjustable with the seeder and having its power-receiving end adjacent the said central pivotal connection, and power devices extending from said transmitting element to one of the wheels.

3. The combination of the wheel frame having a vertically adjustable element, the main frame supported on and vertically adjustable with said element, the seeder mechanism vertically adjustable either with the main frame or relatively thereto and rockably adjustable, laterally, relatively to the wheel frame and having positively actuated seed-delivering mechanism, and a train of power-transmitting devices extending from the hub of one of the ground wheels to the front end of the main frame and thence backward in the longitudinal vertical planes of said frame to the seeder mechanism.

4. The combination of the wheeled frame comprising two ground wheels and an intermediate vertically adjustable axle element holding said wheels against movement with respect to each other longitudinally of the machine, and adapted to hold them, alternatively either higher than the other, the main frame pivotally supported on and vertically adjustable with said axle element, the seeder mechanism carried by the main frame and vertically adjustable relatively thereto, whereby it is also vertically adjustable relatively to said wheel frame, and rockable laterally relatively to the wheel frame, and seeder operating means actuated by one of said wheels.

5. The combination of the seeder, the furrow opener, the main frame which carries the seeder, means for vertically moving the seeder relatively to said frame, the ground wheels, the wheel frame with a transversely extending element holding said wheels continuously fixed longitudinally relatively to each other irrespective of whether one wheel is higher or lower than the other, seeder operating means actuated by one of said wheels, and devices connecting the main frame and said wheel frame, as set forth, to permit the seeder to travel normally in predetermined horizontal position and permit the wheels, while in normal operative relation with the seeder, to travel along different horizontal lines.

6. The combination of the ground support comprising two ground wheels and an intermediate vertically adjustable wheel frame element adapted to hold said wheels fixed longitudinally, the main frame adjustably connected to said vertically adjustable element, the seeding mechanism adjustably supported on the main frame and rockable laterally and adjustable vertically relatively to the said ground support, and means for driving the seeding mechanism from one of said ground wheels.

7. The combination of the main frame, the normally horizontal seeding mechanism carried by and vertically adjustable relatively to said frame, the wheels, the wheel frame element holding said wheels continuously fixed longitudinally, devices connecting the main frame to the wheel frame and adapted to permit the wheels to be moved vertically relatively to each other to different operative positions while they are held fixed longitudinally, means for locking the wheel frame to the main frame when the wheels are in either of said operative positions, and uniformly acting seeder-operating devices actuated by one of said wheels.

8. The combination of the main frame, the seeding mechanism carried by said frame and vertically adjustable relatively thereto, the wheeled support comprising a transversely positioned frame element, ground wheels carried by said frame element and held thereby against longitudinal movement relatively to each other, a member providing a transversely positioned vertically adjustable axis for said frame element, means connecting said member with the main frame and providing a longitudinal horizontal axis therefor around both of which axes the seeding mechanism can be adjusted relatively to the wheels, and a uniformly acting power transmitter connecting the seeding mechanism to one of said wheels.

9. The combination of the main frame, the seeding mechanism carried by and vertically adjustable relatively to said frame, the two ground wheels, the transversely positioned wheel frame element holding said wheels, alternatively either higher than the other and holding them both continuously fixed longitudinally relatively to each other, means connecting the transverse wheel-frame element and the main frame, comprising two pivotal connections having intersecting axes respectively disposed longitudinally and transversely, and a uniformly operating power transmitter between the seeding mechanism and one of said wheels.

10. An implement of the character described comprising main and wheel frames pivotally connected together to rock relatively to each other about a longitudinal axis, said wheel frame including an arched axle adapted to rock about a transverse axis relatively to the main frame, devices for locking said main and wheel frames in fixed relation to each other, ground wheels mounted on said arched axle, a furrow opener carried by the main frame and vertically adjustable relatively thereto, seeding devices supported by the main frame, and power transmitting devices adapted to operatively connect one of said wheels with said seeding devices regardless of the relative positions of said seeding devices and said arched axle.

11. An implement of the character described comprising a transversely disposed wheel frame including an arched axle adapted to rock about a transverse axis, ground wheels mounted on said axle and held thereby in fixed relation to each other longitudinally of the implement, means for locking said axle in fixed relation to the wheel frame, a main frame connected with the wheel frame to rock laterally relatively thereto about a longitudinal axis and vertically adjustable by the rocking of said axle, a furrow opener carried by and adjustable with said main frame, means for locking the main frame against such lateral rocking, seeding devices supported by and adjustable with said main frame, and power transmitting devices adapted to operatively connect one of said wheels with said seeding devices regardless of the relative positions of said seeding devices and said axle.

CARL G. STRANDLUND.